Patented Feb. 26, 1935

1,992,681

UNITED STATES PATENT OFFICE 1,992,681

PROCESS FOR THE PRODUCTION OF SULPHATES BY THE MUTUAL REACTION OF SULPHUR DIOXIDE, OXYGEN, AND BASES IN AN AQUEOUS MEDIUM

Conway, Baron von Girsewald and Erich Stahl, Frankfort-on-the-Main, Germany, assignors to American Lurgi Corporation, New York, N. Y., a corporation of New York No Drawing. Application March 25, 1930, Serial No. 438,894. In Germany March 27, 1929

17 Claims. (Cl. 23—119)

This invention relates to a process for the production of sulphates by the oxidation of sulphurous acid or a salt thereof, in an aqueous medium, by means of gaseous oxygen or a gas containing the latter.

It has already been proposed to produce alkali sulphates, especially ammonium sulphate, by the oxidation of alkali sulphites or sulphurous acid, with air or other gases containing oxygen, in the presence of a base and an aqueous medium, for example by passing air through a solution of the sulphite concerned, or by irrigating a mixture of ammonia, sulphurous acid and air with water.

Up to the present, however, none of these proposals has led to practically utilizable results, because the oxidation proceeds far too slowly under the operating conditions employed. In order to obtain a better utilization of the amounts of sulphur dioxide employed for example, in mixtures of sulphur dioxide and air, attempts have been made to pass this gaseous mixture repeatedly through the aqueous medium. Even in this manner, however, it has not been found possible, in a sufficiently short time, to increase the degree of conversion to a really satisfactory extent, or to obtain solutions of such concentration as will enable them to be worked up economically.

On the other hand, endeavours have been made, during the treatment, for example, of ammonium sulphite solutions with air, to accelerate the reaction by employing very large quantities of air, or by a very powerful injection of air, but the results, even in such case, are altogether unsatisfactory, and considerable losses are unavoidably incurred through the escape of ammonia or sulphurous acid along with the very large volumes of gas employed. It has therefore been impossible, even in this manner, to obtain solutions of any considerable concentration, or to convert the sulphite present into sulphate to any adequate extent.

It has now been ascertained in accordance with the present invention, that the conversion of sulphur dioxide and oxygen into sulphates proceeds in an extremely smooth and rapid manner by passing a gaseous mixture containing sulphur dioxide and oxygen—for example a mixture of $SO_2$ and air—the oxygen being preferably in excess, into an aqueous medium in a very fine state of subdivision and arranging for the presence, or admission, of basic substances in the amount necessary for combining with the sulphuric acid formed, whereby the hydrogen ion concentration of the resulting liquid is maintained at between a pH value of not less than 4 and that point at which neither sulphur dioxide nor base is released.

An advantageous method of procedure is to keep the reaction liquid at a pH value of about 4 to 5 during the passage of the gaseous mixture, by continuously introducing the necessary amounts of bases, such as ammonia in the gaseous form, or in the state, for example, of a concentrated aqueous solution. When ammonia is used, it is generally advisable, in order to prevent losses of ammonia, to regulate the amounts of the reacting substances supplied, in such a manner that a small residue of $SO_2$ is always present in the effluent gases. In this manner, the sulphur dioxide employed can be almost completely oxidized, in a very short time and without losses of ammonia, and with a relatively low consumption of oxygen or air, so that, as a rule, the oxygen present in the gaseous mixture—for example, roasting-furnace gases—under treatment, is sufficient in itself. Moreover, depending upon the comparatively small volume of the gases to be put through the apparatus, the dimensions of the latter can be kept relatively small. At the same time, owing to the small volume of effluent gases, the absolute losses of $SO_2$ are smaller—even when their percentage of unconverted $SO_2$ remains the same—than when a large excess of air is employed.

The process may be carried out with gases containing sulphur dioxide, such as are obtained, for example, in the roasting of pyrites, zinc blende, gas-purifying agents and like substances, and in particular such roasting-furnace gases as contain less than 5% of $SO_2$, or other gases containing $SO_2$ in only small quantities, such as are obtained, for example, in desulphurizing slags, and especially blast-furnace slag derived from the metallurgical treatment of iron or from blowing copper matte, or similar metallurgical products, and which cannot be profitably treated for the production of sulphuric acid by the usual methods, by reason of their low $SO_2$ content, or for other reasons, may be employed. Nevertheless, gases with a higher $SO_2$ content, such as 7% and over, can also be employed with advantage. That extremely fine state of division of the gaseous mixture, containing sulphur dioxide and oxygen, which is essential for the attainment of good results, can be obtained in a great variety of ways, for example by employing injected jets of liquid, on the principle of the water-jet pump, or by the suction produced, for example, by means of high-speed agitators or other mechanical means, or also by forcing the gaseous mixture through porous materials, such as microporous filter slabs, suitable filter cloth or the like. For example, the process may be carried out in a vessel the bottom of which is constructed of porous filter slabs, the mixture of sulphur dioxide and air being forced, from below, through the porous bottom, into the vessel, which is charged, to a sufficient depth, with the aqueous medium (such as water), while the basic substance, such as ammonia (for example in the form of gas) is introduced directly into the liquid. As a rule the ascending bubbles of gas will effect a sufficient intermingling of introduced, e. g., solid basic substance, with the liquid, but the action can be intensified by other means, such as mechanical stirrers, if desired. The gas may be admitted in such a finely divided state and with such velocity that the ascending bubbles transform at least a part of the liquid into foam.

The fine distribution of the gaseous mixture can be advantageously effected by means of filter plates composed of two layers, for example a microporous upper layer, about 5 mm. thick, determining the dimensions of the gas bubbles, and a thicker (e. g. about 30 mm.) macroporous lower layer serving as a supporting frame. This arrangement lowers the resistance of the plate to the passage of the gas, and thus reduces the power needed to force it through. In order to obtain the greatest possible oxidation of the $SO_2$, it is advisable that the depth of the liquid in the reaction vessel should not be less than a certain minimum, corresponding to the other working conditions. Thus, for example, other conditions being equal, the conversion obtained with a depth of 50 cm. of liquid, was 92–95%, but increased to 99–100% when the volume was increased to a depth of 1 meter by the formation of foam.

The rate of supply of the basic substance can be regulated by usual methods. Given sufficient care in operating, the final gases can be kept approximately neutral. However, in order to prevent losses of ammonia—when that substance is employed—it is generally advisable to allow the escaping gases to contain a small amount of $SO_2$, for example about 0.1% by volume.

The conversion can be effected at ordinary or elevated temperature, and continued, if desired, until a saturated solution of the corresponding sulphate is obtained, or it may be carried still further, in such a manner that, for example, the additionally formed salt, separating out from the solution in proportion as it forms, is removed continuously or at intervals. Apart from accelerated reaction, and therefore the possibility of an increased throughput, operating at raised temperature, such as 80° C. or over, affords the special advantage that (with intermittent working) the solid salt separates out from the resulting hot-concentrated solution on cooling, without needing concentration, and the mother liquor can be returned to the process for enrichment over again. Alternatively, the salt progressively deposited from the hot solution, when supersaturation occurs, can be continuously removed from the solution by suitable devices. Working at elevated temperature, or continuing the operation beyond the limit of saturation, saves not only the consumption of fuel for concentrating the solution, but also the apparatus needed for that purpose, such as concentrating pans, heating appliances and the like, whilst, in most cases, the heat needed for heating the solution can be wholly or mostly furnished by the heat of the reaction.

*Example 1*

(A) A mixture containing air and about 3–5% of sulphur dioxide is forced, from below, into a vessel containing a depth of about 75 cm. of water, through a filter plate consisting of an upper, microporous layer about 5 mm. thick—which determines the dimensions of the gas bubbles—and a thicker macroporous layer. At the same time, ammonia is continuously introduced in such amount as to neutralize all the $SO_2$ admitted, or to produce an excess of ammonia. 82% of the $SO_2$ will be oxidized to $SO_3$. The resulting, fairly concentrated solution, contains about 82% of the ammonia in the form of neutral ammonium sulphate, and, in addition, about 18% of the ammonia as sulphite.

(B) If a slightly smaller amount of ammonia be introduced than is needed for the complete neutralization of the $SO_2$ employed, but at least so much that the effluent final gas contains not more than 0.1% by volume, of $SO_2$, over 95% of the dissolved $SO_2$ will be oxidized to $SO_3$. The solution, which is nearly saturated with ammonium sulphate, will contain the whole of the ammonia as ammonium sulphate and, in addition, small amounts of free $H_2SO_3$ which escape during the concentration of the solution. The expulsion can be facilitated by adding a little sulphuric acid. The ammonium sulphate is separated from the solution by concentration.

(C) If, in operating in the described manner, the temperature be allowed to rise, for example to about 80–90° C., by the heat of the reaction itself, or by supplying heat from outside—for example, by employing hot or preheated gases, passing steam or by any other method of direct or indirect heating—the reaction can be carried on until a solution, which is saturated at said temperature, is obtained and contains about 93–95% of the ammonia as sulphate. On cooling, 1 cubic metre of this solution will furnish about 120 kg. of ammonium sulphate, containing less than 0.1% of sulphite.

In all cases the final gas is free from ammonia.

Further researches have shown that ammonia may be replaced by other bases, with formation of the corresponding sulphates. The bases may be introduced into the solution in the gaseous form (e. g. as ammonia), or dissolved (e. g. as ammonia or NaOH), or in a finely divided solid state (e. g. as powdered ZnO, CuO and the like).

*Example 2*

A mixture containing air and about 3–5% of sulphur dioxide is introduced, in the manner described in Example 1, into a suspension of cupric oxide in water. The cupric oxide is supplied in such a manner as to be always in excess, and it is maintained in a uniformly well-distributed condition in the aqueous medium by effective stirring. It is noted that CuO used in excess does not serve to increase the pH value of the reaction mixture up to 7 or above. The same effect can also be produced, with advantage, for example by introducing the mixture of $SO_2$ and air into the liquid through a porous tube rotating therein.

Of the sulphur dioxide introduced, 85–90% is oxidized to $SO_3$. The solution can be enriched, at elevated temperature if desired, until saturated with copper sulphate. The final gases contain less than 0.1% of $SO_2$. The copper sulphate in the solution (enriched in or saturated with copper sulphate) obtained at elevated temperature, can be separated therefrom by cooling, the mother liquor being then returned to the process.

It has also been ascertained to be of advantage in many instances, to facilitate the process by catalytic action. For example, it has been found that, in the case of more or less concentrated solutions, the oxidation is retarded, even when operating at elevated temperatures, such as about 80° C. It was then ascertained that, even in such solutions, at least 95% of the sulphur dioxide introduced in the form of, for example, 5% gases, can be immediately oxidized to $SO_3$ in one operation, if the solution contains small amounts of a soluble metallic salt. For example, salts of iron or manganese, such as $FeSO_4$, $MnSO_4$, and especially salts of copper, such as $CuCl_2$, $CuCl$, $CuSO_4$ and the like, have been found suitable. Since copper also remains in solution in an ammoniacal reaction liquid, it is possible, by employing copper salts as catalysts, to operate also in alkaline (preferably slightly alkaline) solution when producing ammonium sulphate. When copper is employed, it is preferable to use it either in the form of a halide, such as chloride, or, when copper sulphate is employed, to add a soluble halide, such as sodium chloride, in order to keep the copper in solution as $CuCl$.

Even very small amounts, such as about 0.1 grm. of metal per litre of solution, are usually sufficient to produce the catalytic effect. Provided care be taken to ensure that the solution always contains a slight excess of free $H_2SO_3$, these metallic salts will remain in solution, and a pure salt, for example ammonium sulphate, will be obtained by crystallizing, (for example by cooling) the hot-saturated solution (for example).

Example 3

Ten litres of a solution containing 540 grms. of ammonium sulphate per litre, together with 0.4 grm. of $CuSO_4$ (0.1 grm. of Cu) per litre, as catalyst, and 2.0 grms. of NaCl per litre, to keep the copper in solution, were charged into a glass tube 2.20 metres high and of 1.0 sq. decimetre cross-sectional area, the bottom of which was closed by a funnel having a porous stone plate, of the kind used for filtering purposes, cemented into its upper part, and a mixture of $SO_2$ and air, containing 7% by volume of $SO_2$, was forced up through the porous plate at the rate of 10 litres per minute. The porous plate resolved the gaseous mixture into such very fine bubbles that a layer of foam, 0.5 to 1.0 meter high, was formed. At the same time, a 20% aqueous solution of ammonia was introduced from above, through a tube extending to the bottom of the reaction space, at a rate sufficient to keep the acid neutralized, and so that the effluent gas contained a small amount but not more than 0.1%, by volume, of $SO_2$. The temperature of the reaction vessel was maintained at 80° C. by means of a water jacket. At the end of 7 hours, the solution was cooled down to 20° C. 1700 grms. of crystalline ammonium sulphate and 9.8 litres of mother liquor, containing 540 grms. of ammonium sulphate per litre, were obtained. Notwithstanding the high final saline concentration attained, practically the whole of the $SO_2$ introduced was oxidized to $SO_3$.

It was also ascertained that, instead of introducing into the aqueous medium, both the oxygen (or gas containing same) needed for the reaction, and also the sulphur dioxide, in the form of a mixture, in a finely divided condition, the oxygen (or mixture, such as air, containing same) may be introduced alone, into an aqueous medium which contains sulphurous acid, or its salts, or in which, during the introduction of the gas containing oxygen, sulphur dioxide or a gaseous mixture containing same, is introduced in a convenient manner, or sulphurous acid or a salt of same, can be introduced in the form of a solution or as a solid salt.

Thus, for example in the production of ammonium sulphate, the sulphurous acid may be introduced in the form of solid ammonium sulphite, which has been prepared, for example by combining ammonia with sulphur dioxide and water and deposited in electric filters or bag houses.

This method of procedure affords the advantage that the gas, to be introduced no longer needs to be carefully free from flue dust beforehand, in view of the risk of choking the pores of the admission devices, and that, moreover, the risk of attack of the metal fittings of the compressors by sulphur dioxide is absent, and that, in most cases, only a smaller volume of gas has to be brought to the pressure needed to effect the fine distribution—for example by forcing it through porous plates—and that the cross-sectional areas of the apparatus can be smaller for the same total output.

Of course, in this method of operating, instead of introducing only finely divided gases containing oxygen and free from sulphur dioxide, into the aqueous medium, it is also feasible to introduce merely a portion of the sulphur dioxide in a finely divided condition, for example in admixture with air, and to introduce the remainder in the form of gas or liquid, or in the form of a salt, in solid or other form, also in admixture with air if desired, and in any other convenient way.

It is also advisable, in all these cases, to regulate the supply of the reaction components—for example, in the case of free sulphurous acid, the introduction of the same and of the basic substance (such as gaseous or dissolved ammonia) needed for the formation of salts—in such a way that the solution remains as far as possible neutral during the reaction process, for example between the limits of pH about 4 to 5.

Example 4

A gas containing up to 20% of $SO_2$ is passed, at the rate of 2 litres per minute and at a temperature of 80° C. into 10 litres of a cold-saturated ammonium sulphate solution, through a perforated coil for example. An amount of ammonia (in the gaseous state or in aqueous solution) equivalent to the $SO_2$ introduced, is admitted into the solution through a second tube. 12 litres of air per minute are introduced, in a finely divided condition, through the permeable bottom of the vessel. A solution containing ammonium sulphate, and less than 1 grm. of ammonium sulphite per litre, is obtained, from which the ammonium sulphate can be recovered by cooling.

Example 5

Solid ammonium sulphite, prepared for example by the combination of ammonia, sulphur dioxide and water and deposited in electric filters or bag houses, is continuously introduced (as such or in solution) into a saturated solution of ammonium sulphate containing 0.4 grm. $CuSO_4$ (0.1 grm. of Cu) per litre as catalyst, whilst at the same time, air, in an extremely fine state of division, is blown in from below, for example through the permeable bottom of the vessel containing the liquid. In this manner, in 10 litres of solution, 100 grms. of ammonium sulphite per hour can be oxidized to sulphate, by means of about 500 litres of air at 80° C. and in presence of 0.1 grm. of Cu as catalyst.

By the expression "inorganic sulphurous acid compound" appearing in the appended claims we mean to include sulphur dioxide, sulphurous acid, and inorganic salts of sulphurous acid which are soluble in water.

We claim:—

1. Process which comprises reacting a gas containing free oxygen, in a state of very fine subdivision, with a soluble inorganic sulphurous acid compound in an aqueous medium while maintaining the hydrogen ion concentration of the resulting reaction liquid at a quantity between a pH value of not less than 4 and that point at which neither sulphur dioxide nor base is released, by the introduction into said reaction liquid of a basic substance.

2. Process as defined in claim 1, characterized therein that the reaction liquid is maintained at a hydrogen ion concentration equivalent to a pH value of from 4 to 5.

3. Process as defined in claim 1, characterized in that introduction of free oxygen-containing gas, sulphur dioxide and basic substance into the reaction liquid is effected at a temperature above normal room temperature and is continued until a content of sulphate has accumulated in the reaction liquid at least approaching the saturation point of that liquid, cooling the reaction liquid thereby precipitating sulphate, and re-using the resulting mother liquor as aqueous medium in a repetition of the process aforesaid.

4. Process as defined in claim 1, characterized in that the free oxygen-containing gas is atmospheric air.

5. Process as defined in claim 1, characterized in that the basic substance is ammonia.

6. Process as defined in claim 1, characterized in that the sulphurous acid compound is sulphur dioxide.

7. Process as defined in claim 1, characterized therein that the oxygen-containing gas is passed into the aqueous medium in such a finely sub-divided state and at such a velocity that the said reaction liquid is at least partially converted into foam.

8. Process as defined in claim 1, characterized therein that the reaction liquid is maintained at a hydrogen ion concentration equivalent to a pH value of from 4 to 5, and in that the oxygen-containing gas is passed into the aqueous medium in such a finely sub-divided state and at such a velocity that the said reaction liquid is at least partially converted into foam.

9. Process as defined in claim 1, characterized therein that the soluble inorganic sulphurous acid compound is a soluble inorganic acid salt of sulphurous acid, and in that the oxygen-containing gas is passed into the aqueous medium in such a finely sub-divided state and at such a velocity that the said reaction liquid is at least partially converted into foam.

10. Process as defined in claim 1, characterized therein that the oxygen-containing gas is passed into the aqueous medium in such a finely sub-divided state and at such a velocity that the said reaction liquid is at least partially converted into foam and in that introduction of the oxygen-containing gas, the soluble inorganic sulphurous acid compound and the basic substance into the reaction liquid is effected at a temperature above normal room temperature and is continued until a content of sulphate has accumulated in the reaction liquid at least approaching the saturation point of that liquid, cooling the reaction liquid thereby precipitating sulphate, and re-using the resulting mother liquor as aqueous medium in a repetition of the process aforesaid.

11. Process as defined in claim 1, characterized therein that the oxygen-containing gas is atmospheric air which is passed into the aqueous medium in such a finely sub-divided state and at such a velocity that the said reaction liquid is at least partially converted into foam.

12. Process as defined in claim 1, characterized therein that the basic substance is ammonia and in that the oxygen-containing gas is passed into the aqueous medium in such a finely sub-divided state and at such a velocity that the said reaction mixture is at least partially converted into foam.

13. Process as defined in claim 1, characterized therein that the sulphurous acid compound is sulphur dioxide and in that the oxygen-containing gas is passed into the aqueous medium in such a finely sub-divided state and at such a velocity that the said reaction mixture is at least partially converted into foam.

14. Process which comprises reacting a gas containing free oxygen in a state of very fine subdivision with a soluble inorganic sulphurous acid compound in an aqueous medium while maintaining the hydrogen ion concentration of the resulting reaction liquid at such a quantity that the effluent gas contains not more than a small quantity of sulphur dioxide by the introduction into said reaction liquid of a basic substance.

15. Process which comprises reacting a gas containing free oxygen in a state of very fine subdivision with a solution containing ammonium sulphite while introducing ammonia into said reaction liquid in such an amount that the effluent gas always contains a small quantity of sulphur dioxide.

16. Process for the production of ammonium sulphate which comprises introducing a gas containing free oxygen, in a state of very fine subdivision, into an aqueous solution containing ammonium sulphite while maintaining the hydrogen ion concentration of the solution at a quantity between a pH value of not less than 4 and that point at which neither sulphur dioxide nor ammonia is released by the introduction of ammonia in said solution.

17. Process for the production of ammonium sulphate which comprises causing a gas containing sulphur dioxide to react upon a gas containing ammonia in the presence of water, dissolving the saline mixture containing ammonium sulphite thus formed in an aqueous liquid, and passing a gas containing free oxygen in a very fine state of subdivision into this solution while maintaining the hydrogen ion concentration of the solution at a quantity between a pH value of not less than 4 and that point at which neither sulphur dioxide nor ammonia is released by the introduction of ammonia in said solution.

CONWAY, BARON von GIRSEWALD.
ERICH STAHL.